United States Patent [19]

Koike

[11] Patent Number: 4,901,777

[45] Date of Patent: Feb. 20, 1990

[54] VENEER LATHE

[75] Inventor: Masaru Koike, Obu, Japan

[73] Assignee: Meinan Machinery Works, Inc., Obu, Japan

[21] Appl. No.: 326,624

[22] Filed: Mar. 21, 1989

[30] Foreign Application Priority Data

Mar. 26, 1988 [JP] Japan .................................. 63-73002

[51] Int. Cl.⁴ ................................................ B27L 5/02
[52] U.S. Cl. ................................ 144/213; 144/209 R; 144/365
[58] Field of Search .................... 144/209 R, 211, 213, 144/213 A, 365

[56] References Cited

U.S. PATENT DOCUMENTS

| Re. 31,786 | 1/1985 | Hasegawa | 144/213 |
| 3,349,820 | 10/1967 | Nagaoka | 144/209 R |
| 4,221,247 | 9/1980 | Katsuji | 144/213 |
| 4,263,948 | 4/1981 | Hasegawa | 144/209 R |

*Primary Examiner*—W. Donald Bray
*Attorney, Agent, or Firm*—Brooks Haidt Haffner & Delahunty

[57] ABSTRACT

There is disclosed a veneer lathe comprising a pair of spindles one of which spindles is powered to impart rotating torque to the log and the other of which is non-powered and rotatable with the log, means for detecting the rotation of the non-powered spindle and providing a detect signal, and control means which is operable in response to the detect signal to control the knife carriage feed. The lathe further includes means for detecting the rotation of the powered spindle and providing a detect signal, and means for comparing the detect signals from the two detecting means and providing a control signal, if the difference in angular velocity between the spindles exceeds a predetermined value, thereby to cause the knife carriage to stop its feeding operation.

9 Claims, 6 Drawing Sheets

VENEER LATHE

FIELD OF THE INVENTION

The present invention relates to a rotary veneer lathe for peeling a wood veneer sheet from a rotating log. More specifically, it relates to an improvement in the knife carriage feed arrangement of such a veneer lathe.

BACKGROUND OF THE INVENTION

In a conventional rotary veneer lathe, there is provided a pair of powered spindles which are rotatable synchronously with one another and arranged so as to hold a peeler log at its opposite ends by way of chucks mounted at the ends of such spindles and to drive the log to rotate in cutting operation, and a veneer knife fixedly mounted on a carriage movable along guide ways by lead screws or hydraulic cylinders for feeding the veneer knife into the log periphery at an appropriate rate for producing a veneer sheet with a predetermined thickness. The thickness of a veneer sheet to be peeled in a veneer lathe is determined by the amount of feed of the knife cutting into the peeler log for each turn of the log. For the purpose of controlling the feed rate of the cutting knife supported on the carriage, a feed mechanism for the knife carriage is operatively connected to at least either one of the synchronously driven spindles to detect or monitor the log rotation thereby to determine the carriage feed in conjunction with the rotation of that connected spindle. In such an arrangement, insofar as the log rotation is maintained substantially the same as the rotation of the spindles which drive the log, normal and safe veneer peeling can be accomplished with no fear of producing defective veneer sheet having variation in thickness or of a possible damage, as will be described hereinafter, to the peeler log and/or the veneer lathe per se. Since it is practically difficult to maintain such a condition at all times during lathe operation for logs of all possible qualities, it is unavoidable to have the log rotated at a speed other than that of the spindles.

It is commonly observed during veneer peeling operation on a veneer lathe that the strength of a log being rotated by the spindles is reduced at the location of its engagement with the spindles to such an extent that it cannot resist any more the driving force exerted by the spindles and consequently part of the log is broken gradually or even suddenly, with the result that the log rotation fails to coincide with the spindle rotation. If the spindles are allowed to continue running without application of brake thereto at a proper time, it may result in such a situation that the spindles are continued to run in slipping engagement with the log ends in spite that the log has already been brought out of driving engagement with the spindles and hence substantially stopped. In the lathe of the above conventional arrangement wherein the knife carriage is moved in conjunction with the spindle rotation, the knife carriage feeding will be continued to cause the knife to advance against the log which may be then already at a stop. The result will be excessive and damaging pressure taking place between the peeler log and the knife carriage, which may cause the lathe parts including spindle bearings, cutting knife, etc. and/or the log to be damaged seriously.

As it is known to many veneer or plywood manufacturers, a veneer lathe having a log drive system of new type which is designed to apply turning torque to a log from its outer periphery for driving the log or for assisting in the log driving, as proposed, e.g., by U.S. Pat. Nos. 4,221,247 and 4,269,243, has been put in practical use and is gaining its popularity on the market for its inherent advantages.

In a veneer lathe equipped with such a peripheral drive system, it is usually necessary to drive positively a peeler log initially by using a pair of powered spindles and then to engage drive members of the peripheral drive system with the log for permitting smooth starting of cutting operation. It is also required that the log should be driven by the spindles during roundup of the log at an early stage of cutting, or initial cutting until the log becomes substantially cylindrical, during which the drive members are set to engage the outermost portions of irregularities on the log periphery and, therefore, they may be positioned out of driving engagement with respect to the rotating log. When the driving force or torque is supplied during normal veneer peeling operation mainly from the spindles with the peripheral drive system acting to assist in the log driving, the log ends in engagement with the spindles are naturally susceptible to the damage as mentioned above. When the peripheral drive system is used as the main log drive with the spindles as an auxiliary, on the other hand, the potential speed of the spindles in terms of the log peripheral speed is usually set slightly higher than the speed of the peripheral drive so as to avoid a situation in which the spindle rotation may offer a resistance against the log rotating by the main drive. In the latter allocation of the driving torque, the log ends are subjected to damaging force exerted by the spindles, too.

SUMMARY OF THE INVENTION

An object of the present invention is to provide a veneer lathe which can remove the above drawbacks and disadvantages.

To achieve the above object, there is provided a veneer lathe which comprises a pair of spindles for holding there-between a peeler log at its opposite ends, one of which spindles is powered to impart rotating torque to the log and the other of which is non-powered and rotatable with the log. The lathe further includes means for detecting the rotation of the non-powered spindle rotatable with the log and providing a detect signal which represents the angular velocity of that non-powered spindle and also control means which is operable in response to the detect signal for controlling the feeding operation in such a way that the knife carriage is fed for a given distance for each rotation of said non-powered spindle.

The veneer lathe according to the invention may further include another detecting means for detecting the rotation of the powered spindle and providing a detect signal representing the angular velocity of that spindle and means for comparing the detect signals from the two detecting means and providing a control signal if the difference in angular velocity between the detect signals exceeds a predetermined value, thereby to cause the knife carriage to stop its feeding operation.

Alternatively, there is provided a veneer lathe including a pair of spindles one of which is powered to impart rotating torque to the log, first means for detecting the rotation of the powered spindle and providing a detect signal which represents the angular velocity of that powered spindle, second means for detecting the rotation of the log and providing a detect signal which represents the angular velocity of the log, and means for comparing the detect signals from the two detecting means and providing a control signal, if the difference in angular velocity between the detect signals becomes greater than a predetermined value, thereby to cause the knife carriage to stop its feeding operation.

In the veneer lathe according to the present invention, the knife carriage can be fed at the desired rate in conjunction with the rotation, or the angular velocity, of the nonpowered spindle which rotates synchronously with the log and, therefore, the knife carriage feeding can be effected properly independently from the rotation of the powered spindle which does not necessarily represent the log rotation. Thus, an error in the carriage feed can be minimized effectively and the fear of allowing the knife carriage to be fed excessively into the log periphery in the event that the log speed fails to coincide with the speed of the powered spindle 1a can be reduced successfully.

In the arrangement of the veneer lathe wherein the knife carriage feed is caused to stop automatically if the difference in angular speed between the spindle and the log exceeds a predetermined value, the danger of the knife carriage being fed damagingly against the log can be reduced effectively.

The above and other objects, features and advantages of the present invention will become apparent to those skilled in the art from the following description of various embodiments of veneer lathe according to the invention, which description is made with reference to the accompanying drawing, wherein:

DETAILED DESCRIPTION OF THE EMBODIMENTS

Figure 1:
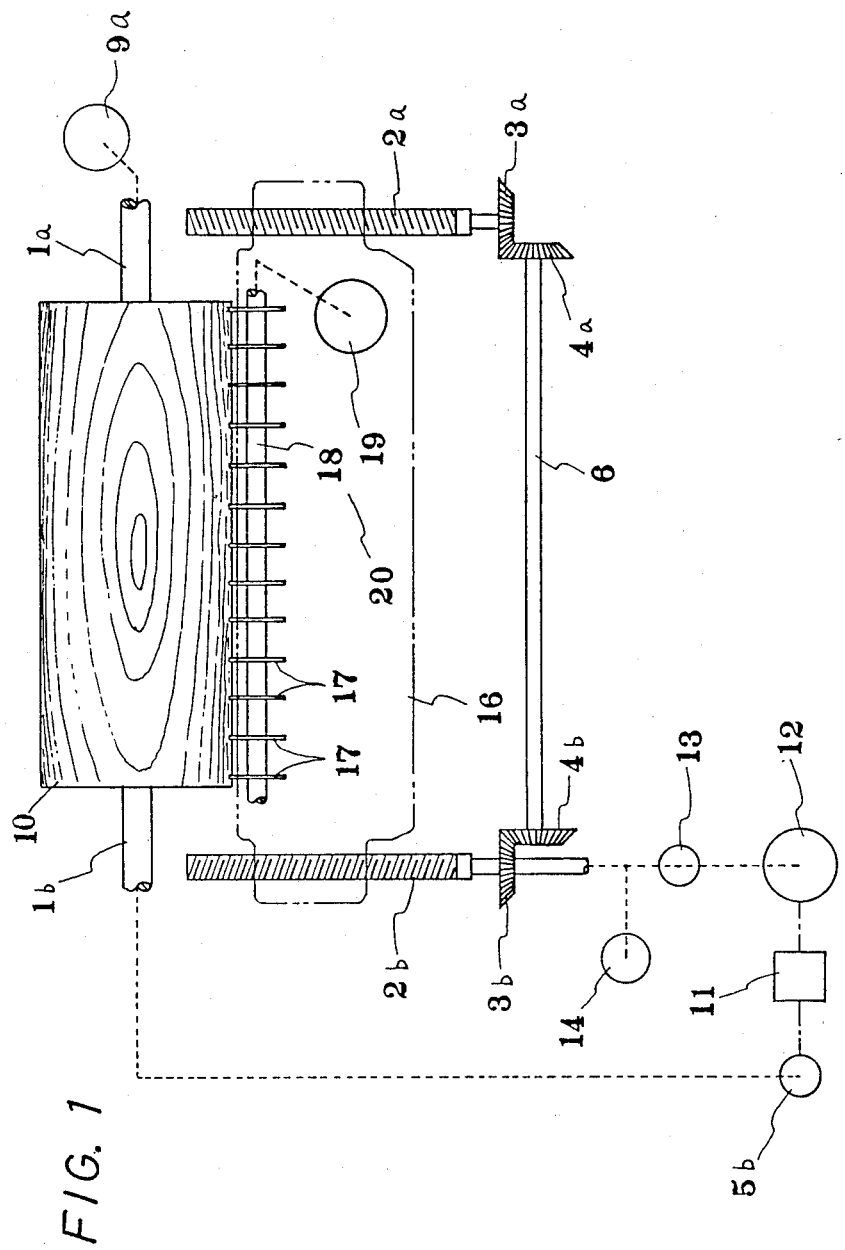
FIG. 1 is a schematic diagram in plan view showing an embodiment of veneer lathe according to the present invention.

Referring to FIG. 1, there is shown a schematic diagram of a veneer lathe in which a wood block or a log 10 is held by a pair of opposite chucks (not shown) mounted at the inner ends of spindles 1a 1b. One spindle 1a shown on the right-hand side in the drawing is operatively connected to a main drive 9a including an electric motor (not shown) for positively driving the spindle at any desired speed, while the spindle 1b is non-powered and connected to any suitable detector 5b such as a rotary encoder for detecting or counting the number of rotations for a given length of time, or the angular velocity, of the spindle 1b. The reference numeral 16 designates a knife carriage (shown by a phantom line) having a veneer cutting knife (not shown) supported thereon and extending the entire length of the log 10 in parallel to the axis thereof. The knife carriage 16 is movable along guide ways (not shown) in both forward feeding and backward retracting directions by rotation of a pair of oppositely disposed feed screws 2a, 2b in a known manner. The feed screws 2a, 2b have a pair of bevel gears 3a, 3b engaged with another pair of bevel gears 4a, 4b mounted at the opposite site ends of a connecting shaft 6. The feed screw 2b is operatively connected to a feed drive 12 including an electric motor (not shown) by way of clutch means 13, e.g. an electro-magnetic clutch. The feed drive 12 is in turn connected to the rotary encoder 5b through a control device 11 which is adapted to control the operation of the feed drive 12 in response to signals emitted by the rotary encoder 5b.

The numeral 14 designates a rapid feed drive including a motor (not shown), which is adapted to disconnect, when required, the feed screws 2a, 2b from the drive 12 by disengaging the electro-magnetic clutch 13 from an operator's control panel (not shown) and to drive the knife carriage 16 to move at a rapid rate in advancing or retracting directions. It is noted that this rapid feed drive 14 may be omitted if the feed drive 12 is arranged so as to rotate the feed screws 2a, 2b at any speed desired for the rapid movement of the knife carriage 16 in either direction independently of the operation of the control device 11.

In FIG. 1, a peripheral log drive system as disclosed, e.g., by U.S. Pat. Nos. 4,221,247 and 4,269,243 is generally designated by the reference numeral 20, which includes a plurality of drive members 17 made in any suitable form such as disc, spiked wheel, endless belt, etc. and fixedly mounted at spaced intervals on a rotatable shaft 18 extending parallel to the axis of the peeler log 10. In operation, the shaft 18 is positioned with its drive members 17 engaged with the outer periphery of the peeler log 10 adjacently to the position of its engagement with the veneer knife and driven by a drive 19 including an electric motor (not shown) to rotate the drive members 17 at a peripheral speed that substantially corresponds to the peripheral speed of the log 10 which is effected by the powered spindle 1a. By providing such an auxiliary drive system, any given proportion of the log turning torque required for veneer peeling can be supplied from the log periphery for assisting in log driving. As it would be understood by those skilled in the art, the use of this peripheral drive arrangement in combination with the spindle drive can help effectively reduce the tendency of logs being broken at the location of their engagement with the powered spindle 1a.

When the peripheral drive system, as exemplified by 20, is used in combination with the powered spindle 1a, it is desirable that the rotation of one drive member (the spindle 1a or the drive members 17 carried on the shaft 18) should not offer any appreciable driving resistance against the other drive member. To minimize such a resistance, the rotational speed of the drive members 17 on the shaft 18 should be set so as to act to drive the log at a peripheral speed that is potentially slightly higher than the log peripheral speed by the powered spindle 1a when it is so arranged that the log driving torque for veneer cutting is supplied mainly from the spindle 1a. When the peripheral drive system is used mainly for the log driving, on the other hand, the rotational speed of the spindle 1a should be set relatively slightly higher than the log peripheral speed to be effected by the peripheral drive system. In the latter case, it may be so arranged that the drive members 17 of the peripheral drive system are driven to run at a constant speed for driving the log at a correspondingly constant peripheral speed and the spindle 1a is driven variably so as to follow the rotational speed of the log 10 which increases with a progressive decrease of the log diameter. The selection of the peripheral drive as the main is more advantageous in that control for the log drive can be made simpler and also that veneer handling in the subsequent process can be facilitated because a veneer sheet produced by the veneer lathe comes out thereof at a substantially constant speed.

Figure 2:
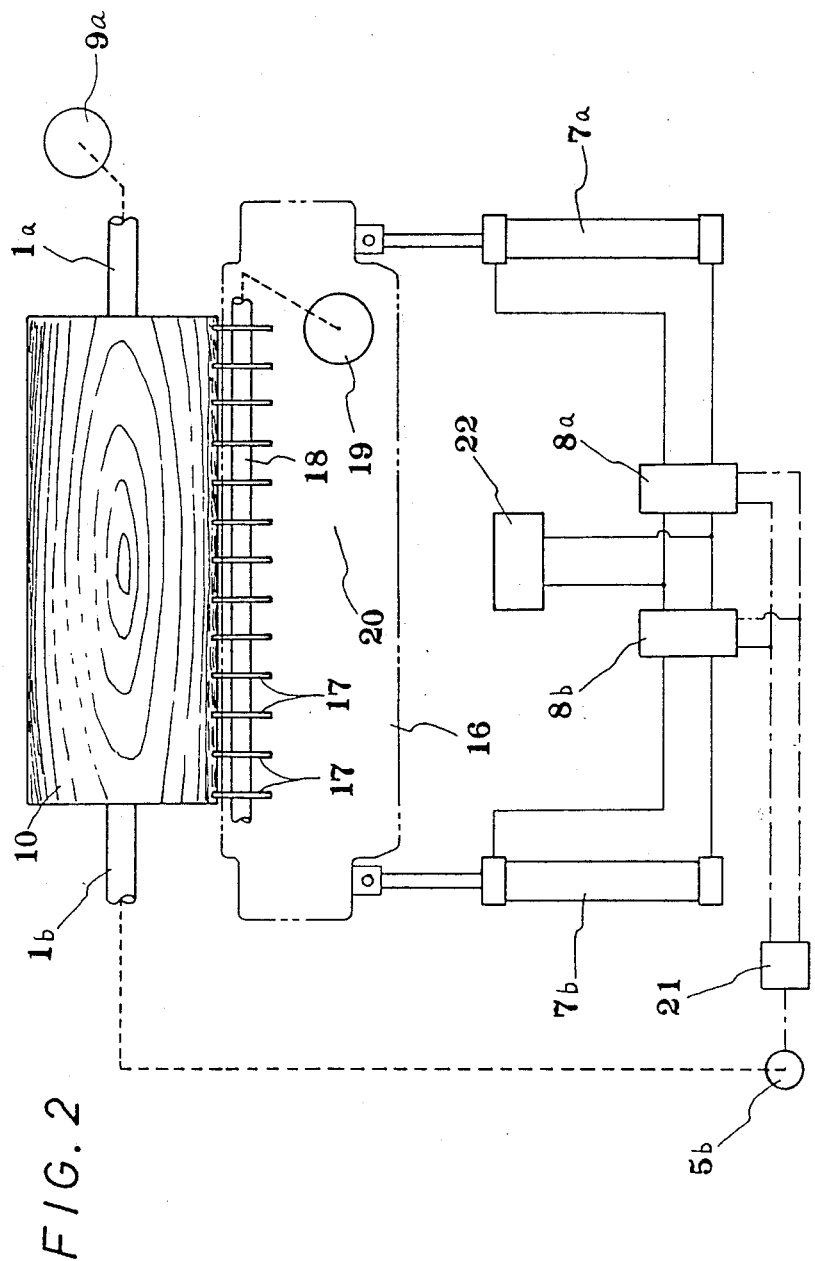
FIGS. 2, 4, 5 and 7 are schematic diagrams in plan view showing other embodiments of veneer lathe of the present invention.

Now referring to FIG. 2 showing the second embodiment of the present invention, wherein like parts of the lathe are designated by like numerals in FIG. 1, the veneer lathe has a pair spindles 1a, 1b and a rotary encoder 5b. The lathe further includes a knife carriage 16 connected to and operated by a pair of hydraulic feed cylinders 7a, 7b which are in turn connected through flow control valve devices 8a, 8b, respectively, to a hydraulic unit 22 for supplying fluid under pressure to the cylinders. The operation of the valve devices 8a, 8b is controlled by a control device 21 operable from signals emitted by the rotary encoder 5b detecting the rotation of the spindle 1b so that the hydraulic cylinders 7a, 7b are operated to feed the knife carriage 16 in accordance with the rotation of the peeler log 10. Though not shown specifically in the drawing, it may be so arranged that the knife carriage 16 can be fed at a rapid rate in both advancing and retracting directions independently from the detect signals from the rotary encoder 5b.

It is to be understood that like parts of the lathe are designated by like numerals in the other embodiments of the invention that will be described in the following.

Figure 3:
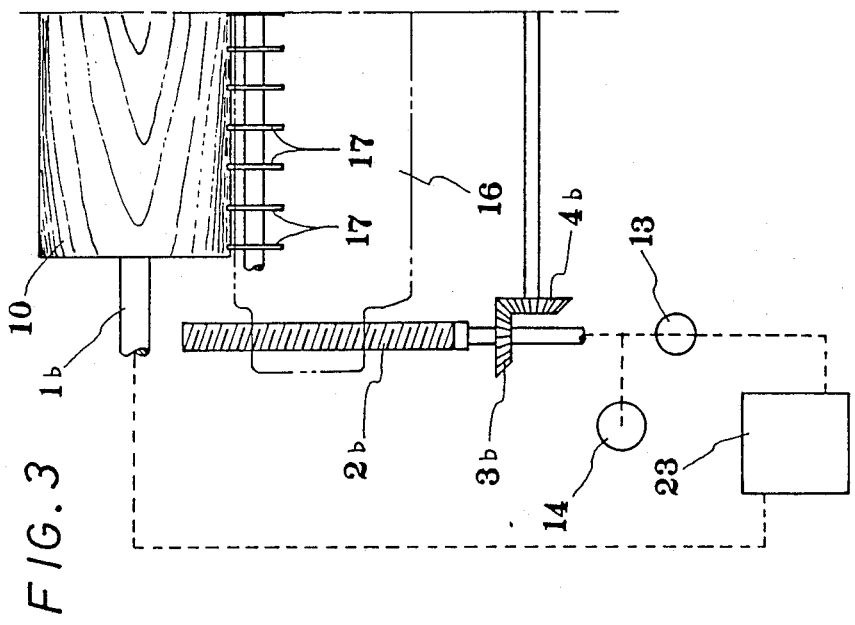
FIGS. 3 and 6 are schematic partial diagrams in plan view showing still other embodiments of veneer lathe of the present invention.

The third embodiment shown in FIG. 3 differs from the embodiment of FIG. 1 in that the arrangement in the latter including the rotary encoder 5b, the control device 11 and the feed drive 12 is substituted with a gear transmission device 23 whose input shaft is connected to the non-powered spindle 1b and whose output shaft is connected to the feed screws 2a, 2b by way of the clutch means 13. The gear transmission device 23, which includes a multistage transmission gear box, a planetary gear box, or any other suitable gear device, is adapted to turn the feed screws 2a, 2b for a given corresponding to the desired feed for each turn of the of the spindle 1b which rotates with the peeler log 10. Though the lathe in this embodiment is advantageous over the first and second embodiments shown in FIGS. 1 and 2, respectively, in that it can be made simpler in construction, but its spindle 1b is subjected to the mechanical resistances exerted by the feed screws 2a, 2b and the gear transmission device 23 and, therefore, the log 10 is subjected to force acting in opposite direction to the log rotation by the powered spindle 1a and thus susceptible to damage at portions thereof adjacent to the spindle 1b. To reduce such resistance, it is preferable that ball screws be used for the feed screws 1a, 1b.

In any of the above-described embodiments, the knife carriage 16 is moved for feeding at the desired rate in conjunction with the rotation of the non-powered spindle 1b which rotates synchronously with the peeler log 10. Thus, the knife carriage 16 can be fed properly independently from the rotation of the powered spindle 1a which does not necessarily represent the log rotation, e.g. when the spindle is brought out of proper driving engagement with its corresponding log end. In this way, an error in the carriage feed for the desired veneer thickness can be minimized effectively and the fear of allowing the knife carriage to be fed excessively into the log periphery in the event that the log speed fails to coincide with the speed of the powered spindle 1a can be reduced successfully.

Figure 4:
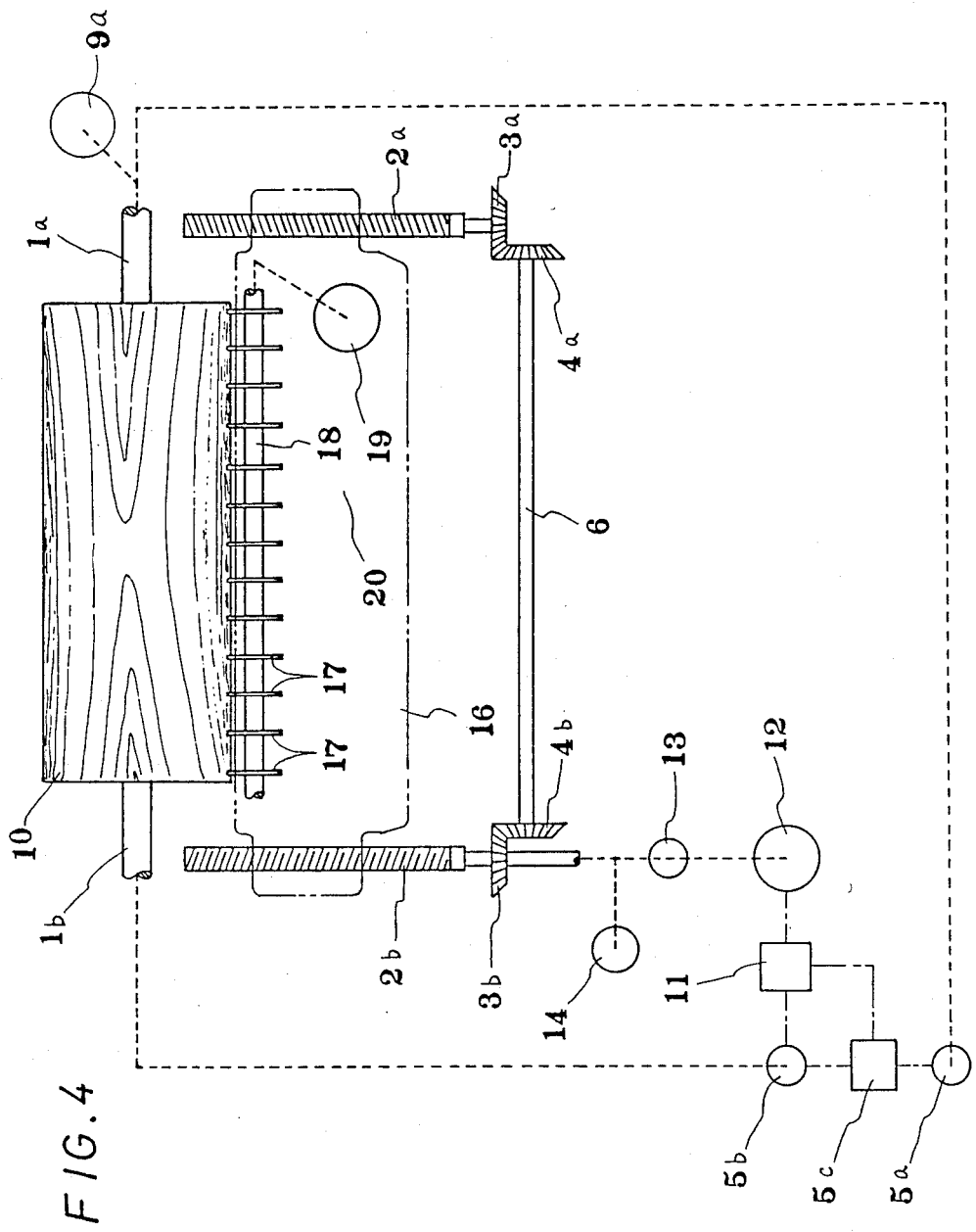

Referring then to FIG. 4, it shows a veneer lathe which is similar to that of FIG. 1, but differs therefrom in that it further includes a rotary encoder 5a which is identical with the counterpart 5b for the non-powered spindle 1b and connected, on one hand, to the driving spindle 1a for detecting the rotation thereof and, on the other, to a comparator 5c. The comparator 5c is connected also to the rotary encoder 5b for the spindle 1b for comparing detect signals emitted from the rotary encoders 5a, 5b and providing a control signal, if the difference in rotation, or angular velocity, between the spindles 1a and 1b exceeds a predetermined value, to the control device 11 which then applies brake to the feed drive 12 in response to that control signal. During normal peeling operation of the lathe in this embodiment when the above difference is within the predetermined value, the knife carriage 16 is fed in conjunction with the rotation of the non-powered spindle 1b which rotates synchronously with the peeler log 10.

Figure 5:
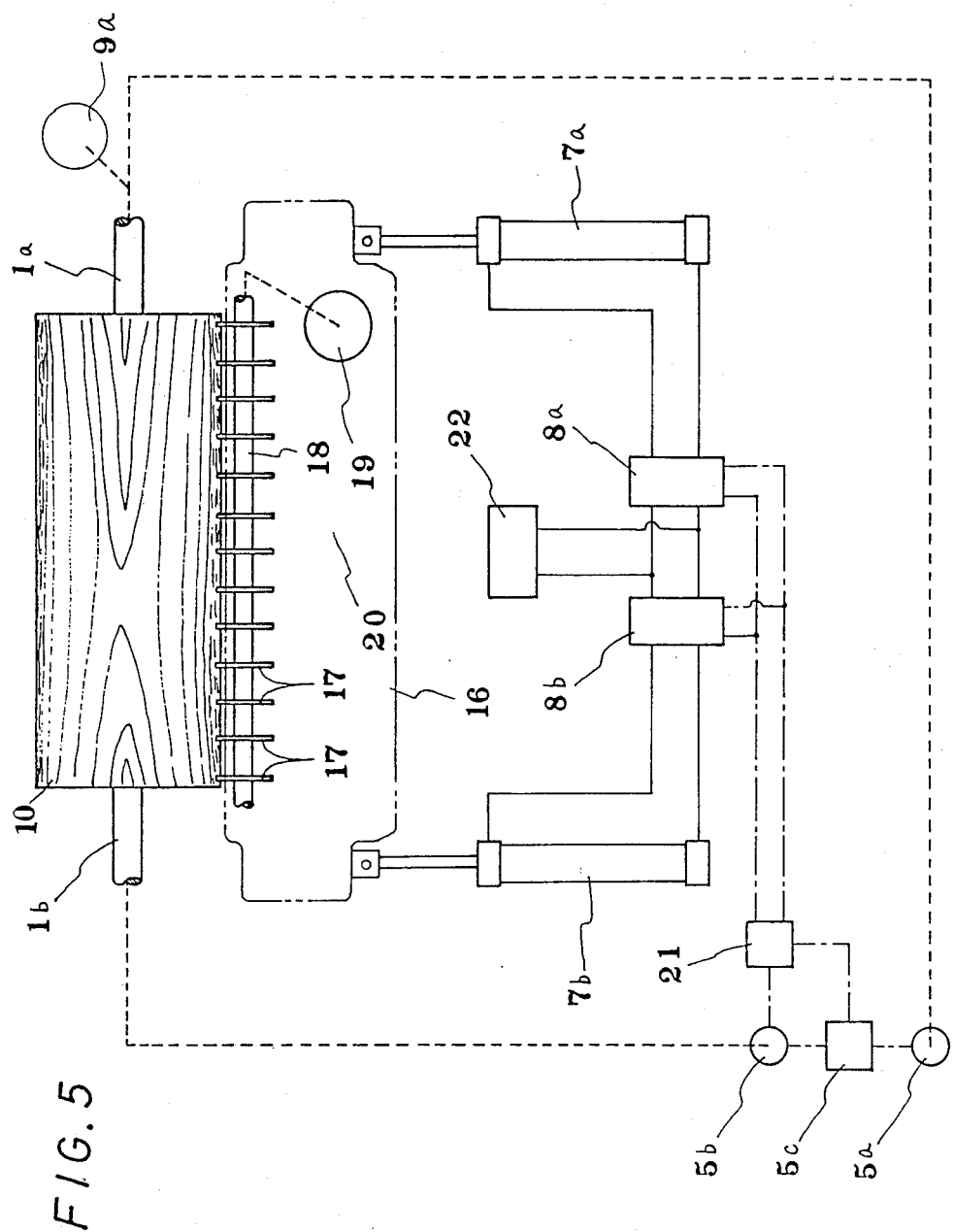

A veneer lathe shown in FIG. 5 is a modification of the embodiment of FIG. 2, further including a rotary encoder 5a and a comparator 5c which are connected in a manner similar to that in the embodiment in FIG. 3. The comparator 5c is connected to the control device 21 to emit a control signal, if the difference in rotation, or angular velocity, between the spindle 1a and the spindle 1b exceeds a predetermined value, to the control device 21 which then shuts off the fluid flow through the flow control valves 8a, 8b to the hydraulic cylinders 7a, 7b in response to that control signal, thereby to cause the knife carriage 16 to stop its movement.

Figure 6:
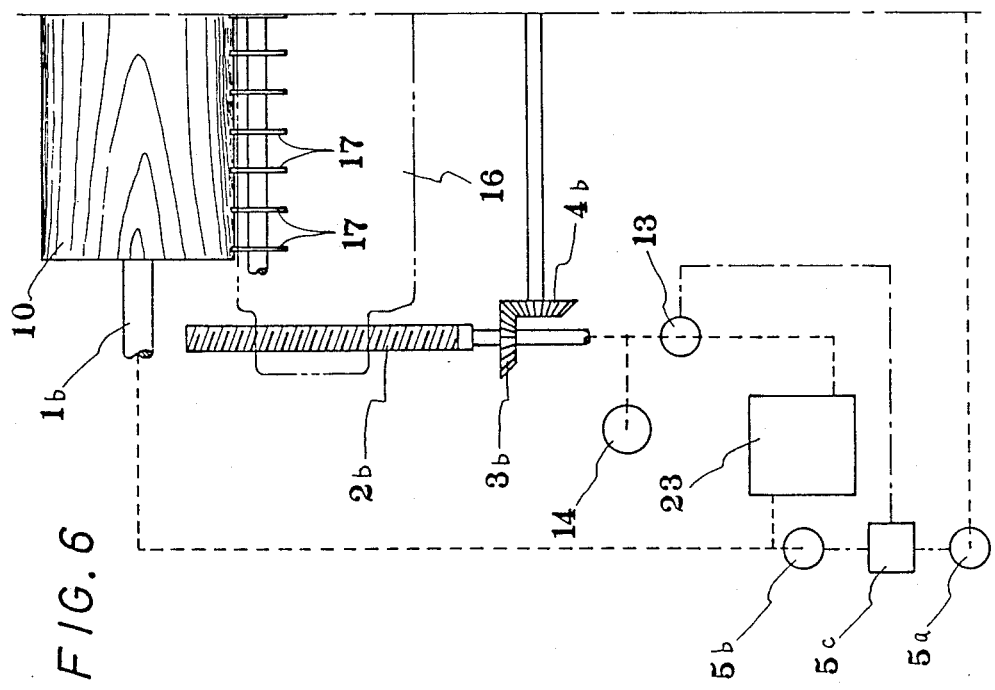

A veneer lathe in FIG. 6 is a modification of the embodiment of FIG. 3, with addition of a rotary encoder 5a for detecting the rotation of the powered spindle 1a (not shown) and a comparator 5c which is connected to the rotary encoders 5a, 5b. The comparator 5c is connected also to the clutch 13 for disengaging the knife carriage feed if the difference in angular velocity between the spindles 1a and 1b exceeds a predetermined value.

Figure 7:
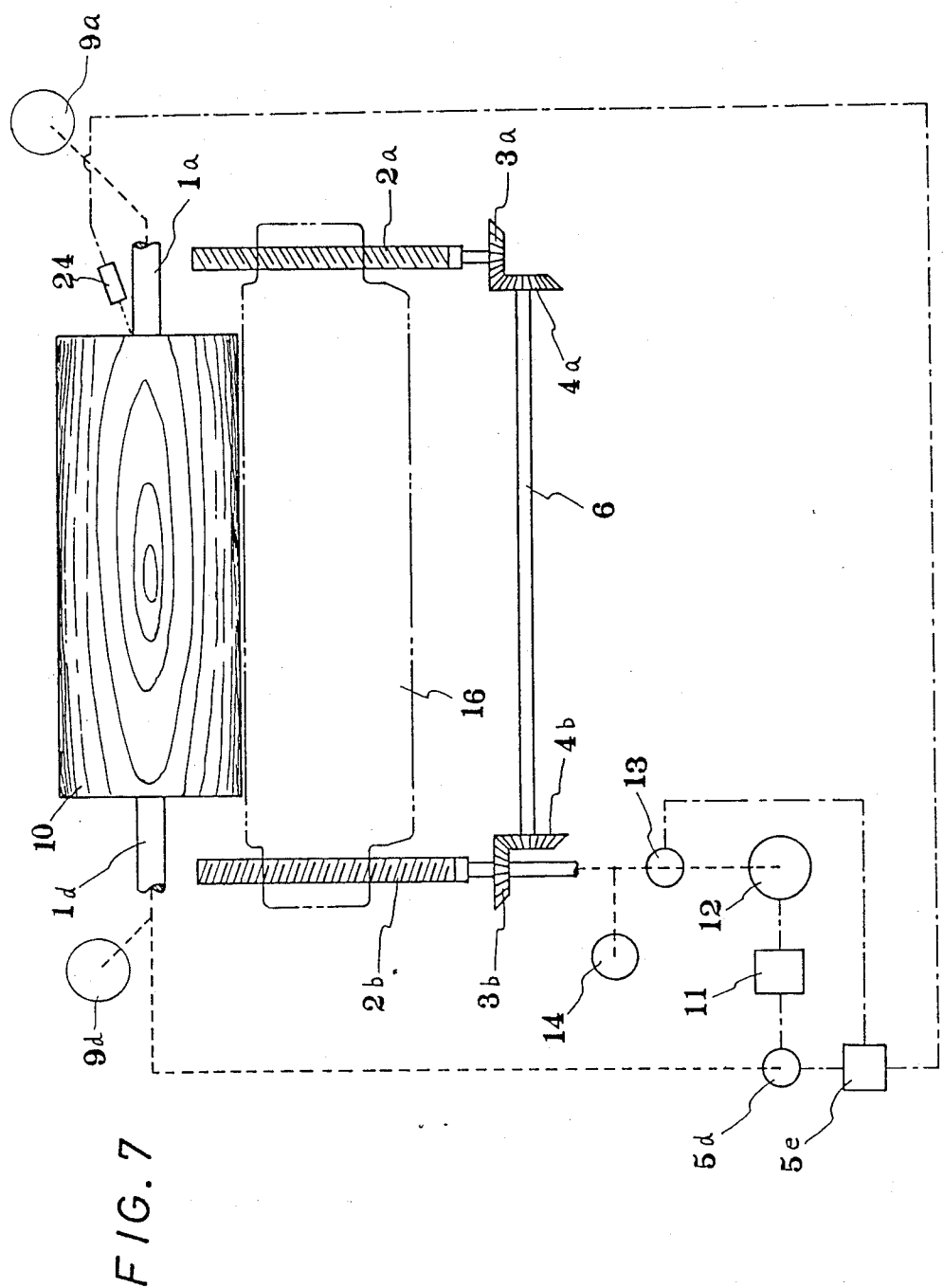

Referring to FIG. 7 showing a modification of the embodiment of FIG. 1, it includes a powered spindle 1d, in place of the non-powered spindle 1b, which is driven by a drive 9d synchronously with the opposite spindle 1a. The spindle 1d is connected to a rotary encoder 5d for detecting the rotation of the spindle 1d, which is in turn connected to the drive 12 through the control device 11. There is provided means 24 for detecting the rotation, or angular velocity, of the peeler log 10 at a given position, preferably, adjacent the spindle 1a. The veneer lathe further includes a comparator 5e connected, on one hand, to the detecting means 24 and, on the other, to the rotary encoder 5d for comparing a signal from the rotary encoder 5d representing the spindle speed and a signal form the means 24 representing the log speed. The comparator 5e is adapted to provide a control signal to actuate the clutch 13 for disengaging the knife carriage feed if the difference in angular velocity between the spindle 1a (1d) and the peeler log 10 becomes greater than a predetermined value. Though now shown in the drawing, the veneer lathe may be equipped with a peripheral driving system as shown in FIG. 1.

In any of the embodiments of FIGS. 4 to 7, the knife carriage feed is caused to stop automatically when the difference in rotational speed between the spindle and the log becomes greater than a predetermined value, thus removing the danger of the knife carriage being fed damagingly against the log, as well as regulating the error in carriage feed within a limited range. As required, it may be so arranged that brake is applied to the spindles 1a, 1b and also to the peripheral drive system, if such is used, in synchronism with the braking or disengagement of the knife carriage feed. Alternatively, the knife carriage may be caused to retract at a rapid rate in synchronism with the braking of disengagement of the carriage feed.

The limit of allowable difference in rotational speed between the spindle and the log should preferably be set within such a range that an error of thickness of peeled veneer sheet may fall within practically allowable tolerances so as to prevent remarkable reduction in veneer yield.

It would be appreciated that the use of the detecting means 24 in the embodiment of FIG. 7 may require its protection during charging of a new log and discharging a peeled core and also in the middle of peeling operation. For this reason, the embodiments of FIGS. 4 to 6 would be more advantageous in terms of the total productivity than the embodiment of FIG. 7 which uses means for detecting the rotation of a peeler log.

For the purpose of improving the accuracy of carriage feed, additional means may be provided in the embodiments of FIGS. 1, 2, 4, 5 and 7, which include means for detecting the movement of the knife carriage and means for compensating for an error, if any, of the carriage movement.

What is claimed is:

1. A veneer lathe comprising:
    a pair of spindles for holding therebetween a peeler log at its opposite ends;
    one spindle of said pair being powered to impart rotating torque to said log and the other spindle being non-powered and rotatable with said log;
    a knife carriage having a cutting knife supported thereon;
    means for feeding said knife carriage toward said log;
    first detecting means for detecting the angular velocity of said non-powered spindle and providing a detect signal representing that velocity of said non-powered spindle;
    control means operable in response to said detect signal for controlling said feeding means in such a way that said knife carriage is fed for a given distance for each rotation of said non-powered spindle.

2. A veneer lathe according to claim 1, wherein said feeding means includes a pair of lead screws operatively connected to said knife carriage and rotatable synchronously, said control means controlling the rotation of said lead screws in response to said detect signal.

3. A veneer lathe according to claim 1, wherein said feeding means includes a pair of hydraulic cylinder units operatively connected to said knife carriage and operable synchronously by fluid under pressure, said control means controlling the operation of said hydraulic cylinder units by adjusting the flow of said fluid under pressure in response to said detect signal.

4. A veneer lathe comprising:
    a pair of spindles for holding therebetween a peeler log at its opposite ends;
    one spindle of said pair being powered to impart rotating torque to said log and the other spindle being non-powered and rotatable with said log;
    a knife carriage having thereon a cutting knife;
    means for feeding said knife carriage toward said log;
    said feeding means including a pair of lead screws operatively connected to said knife carriage and rotatable synchronously, and a gear box having an input shaft connected to said non-powered spindle and an output shaft connected to said lead screws and operable to control the rotation of said lead screws in such a way that said knife carriage is fed for a given distance for each rotation of said non-powered spindle.

5. A veneer lathe according to claim 1, further comprising: second detecting means for detecting the angular velocity of said powered spindle and providing a detect signal representing that velocity of said powered spindle; means for comparing the detect signals from said first and second detecting means and providing a control signal to said control means when the difference in magnitude between said detect signals exceeds a predetermined value; said control means being operable to cause said feeding means to stop its operation in response to said control signal.

6. A veneer lathe comprising:
    a pair of spindles for holding therebetween a peeler log at its opposite ends, at least one of said spindles being powered;
    a knife carriage having thereon a cutting knife;
    means for feeding said knife carriage toward said log;
    first detecting means for detecting the angular velocity of said at least one powered spindle and providing a detect signal representing said velocity;
    second detecting means for detecting the angular velocity of said log and providing a detect signal representing that velocity of said log;
    control means for controlling the operation of said feeding means;
    means for comparing said detect signals from said first and second detecting means and providing a control signal to said control means when the difference in magnitude between said detect signals exceeds a predetermined value;
    said control means being operable to cause said feeding means to stop its operation in response to said control signal.

7. A veneer lathe according to claim 1, further including a log drive system which is adapted to impart rotating torque to said log from its outer periphery.

8. A veneer lathe according to claim 4, further including a log drive system which is adapted to impart rotating torque to said log from its outer periphery.

9. A veneer lathe according to claim 6, further including a log drive system which is adapted to impart rotating torque to said log from its outer periphery.

* * * * *